UNITED STATES PATENT OFFICE.

JOSEPH MICKEL, OF EAST BIRMINGHAM, PENNSYLVANIA.

IMPROVEMENT IN MEDICAL COMPOUNDS OR SALVES FOR THE CURE OF RHEUMATISM.

Specification forming part of Letters Patent No. 120,451, dated October 31, 1871.

*To all whom it may concern:*

Be it known that I, JOSEPH MICKEL, of East Birmingham, in the county of Allegheny and State of Pennsylvania, have invented a Compound for the Cure of Rheumatism; and I do hereby declare that the following is a full, clear, and exact description thereof, which will enable others skilled in the art to make and use the same.

I propose to make a compound for the treatment of rheumatism of the following ingredients, in about the proportions stated: Lard, three pounds; Jimson or Jamestown-weed seed, two ounces; leaves of Jimson-weed, one ounce; Canada-thistle root, one-half ounce; poke-root, one ounce; oil of cinnamon, one-half ounce; the whole forming a salve to be used in the manner of using ordinary salve.

Having thus described my invention, I claim as new and desire to secure by Letters Patent—

The improved salve compound, substantially as herein described.

JOSEPH MICKEL.

Witnesses:
AUGUST AMMON,
NICOLAS JONES. (98)